United States Patent [19]
Rinnbäck et al.

[11] Patent Number: 5,555,260
[45] Date of Patent: Sep. 10, 1996

[54] DECENTRALIZED BASE STATION FOR REDUCING BANDWIDTH REQUIREMENTS FOR COMMUNICATIONS TO AND FROM RADIO TRANSMITTER-RECEIVERS IN A TELECOMMUNICATIONS NETWORK

[75] Inventors: Hans L. Rinnbäck, Järfälla; Häkan M. Halén, Stockholm; Per V. Israelsson, Täby, all of Sweden

[73] Assignee: Telefonaktiebolaget LM Ericsson, Stockholm, Sweden

[21] Appl. No.: 519,016

[22] Filed: Aug. 24, 1995

Related U.S. Application Data

[63] Continuation of Ser. No. 202,179, Feb. 25, 1994, abandoned.

[51] Int. Cl.⁶ ................................. H04B 7/24
[52] U.S. Cl. ................ 370/84; 370/95.3; 370/118; 455/33.1; 455/54.1; 455/72
[58] Field of Search .................. 370/29, 84, 85.7, 370/95.1, 95.3, 109, 118; 455/33.1, 53.1, 54.1, 54.2, 72; 379/63; 375/240

[56] References Cited

U.S. PATENT DOCUMENTS

| 4,322,844 | 3/1982 | Fellinger et al. | 370/84 |
|---|---|---|---|
| 4,377,860 | 3/1983 | Godbole | 370/84 |

(List continued on next page.)

FOREIGN PATENT DOCUMENTS

| 412583 | 2/1991 | European Pat. Off. . |
| 471246 | 2/1992 | European Pat. Off. . |
| 538546 | 4/1993 | European Pat. Off. . |

OTHER PUBLICATIONS

ETSI/TC GSM Recommendation GSM 08.60 Version 3.3.1 "Inband Control of Remote Transcoders and Rate Adaptors", Release date: Oct. 1991, 29 pages.

ETSI RES-3(90)81/Rev. 1, "DECT Features That Influence the Traffic Capacity and the Maintenance of a High Radio Link Transmission Quality", Helsinki, 1–5, Oct. 1990, 15 pages.

HDSL Draft Technical Report T1E1.4/92–002 to T1E1.4/92–002R1, "High-Bit-Rate Digital Subscriber Lines", Feb. 14, 1992, 50 pages.

CMS 88 Cellular Mobile Telephone System EN/LZT 101 908 R2B, Chapter 8, Nov. 30, 1992, pp. 8.1–8.11.

ETSI/GSM GSM Recommendation 08.51 version 3.0.1 "Base Station Controller (BSC) to Base Transceiver Station (BTS) Interface, General Aspects", Jan. 31, 1990, 4 pages.

ETSI/GSM GSM Recommendation 08.52 version 3.0.1 "Base Station Controller (BSC) to Base Transceiver Station (BTS) Interface Principles", Jun. 6, 1989, 15 pages.

ETSI/GSM GSM Recommendation 08.54 version 3.0.0 "Base Station Controller (BSC) to Base Transceiver Station (BTS) Interface", Feb. 2, 1989, 3 pages.

"Application of I–Series Recommendations to ISDN User–Network Interfaces", Basic User–Network Interface, Fascicle III.8 Recommendation 1.420, p. 169.

(List continued on next page.)

*Primary Examiner*—Benedict V. Safourek
*Attorney, Agent, or Firm*—Burns, Doane, Swecker & Mathis, L.L.P.

[57] ABSTRACT

A TDMA cellular mobile radio system has at least one network control unit, at least one radio transceiver, and at least one multiplexor for multiplexing and demultiplexing digitally encoded and compressed speech data transmitted between the network control unit and radio transceiver. The bandwidth of the speech data is reduced through compression. The bandwidth of the speech data required on a radio transceiver side of the multiplexor is further reduced by buffering the speech data arriving at the multiplexor at a relatively high modulation rate, retransmitting the buffered speech data at a relatively lower modulation rate, buffering the speech data arriving from the multiplexor at a relatively lower modulation rate, and retransmitting the buffered speech data at a relatively higher modulation rate.

16 Claims, 6 Drawing Sheets

U.S. PATENT DOCUMENTS

| | | |
|---|---|---|
| 4,589,108 | 5/1986 | Billy ........................................ 370/84 |
| 4,589,110 | 5/1986 | Eng et al. ................................ 370/109 |
| 4,660,196 | 4/1987 | Gray et al. .............................. 370/109 |
| 4,771,424 | 9/1988 | Suzuki et al. ............................ 370/60 |
| 4,797,883 | 1/1989 | Kraus ...................................... 370/109 |
| 4,922,484 | 5/1990 | Yoshida et al. ......................... 370/68.1 |
| 4,964,095 | 10/1990 | Tyrrell et al. ............................ 370/55 |
| 4,965,787 | 10/1990 | Almond et al. ......................... 370/58.1 |
| 4,965,796 | 10/1990 | Petty ....................................... 370/112 |
| 4,975,771 | 12/1990 | Kassatly .................................. 370/109 |
| 4,987,570 | 1/1991 | Almond et al. ........................... 370/84 |
| 4,995,036 | 2/1991 | Copen et al. ........................... 370/118 |
| 5,029,163 | 7/1991 | Chao et al. ............................. 370/95.1 |
| 5,111,454 | 5/1992 | Hung et al. .............................. 455/72 |
| 5,161,152 | 11/1992 | Czerwiec et al. ........................ 370/84 |
| 5,235,632 | 8/1993 | Raith ....................................... 379/59 |
| 5,278,827 | 1/1994 | Pound ..................................... 370/84 |

OTHER PUBLICATIONS

"Application of I–Series Recommendations to ISDN User–Network Interfaces", Primary Rate User–Network Interface, Fascicle III.8 Recommendation 1.421, p. 169.

"Application of I–Series Recommendations to ISDN User–Network Interfaces", ISDN User–Network Interfaces Interface Structures and Access Capabilities, Fascicle III.8 Recommendation 1.412, pp. 163–168.

"ISDN User–Network Interfaces: Layer 1 Recommendations", Fascicle III.8 Recommendations 1.430, pp. 171–179.

Annex A (to Fascicle III.8 Recommendation 1.430) "Wiring Configurations and Round Trip Delay Considerations Used as a Basis for Electrical Characteristics", pp. 209–212.

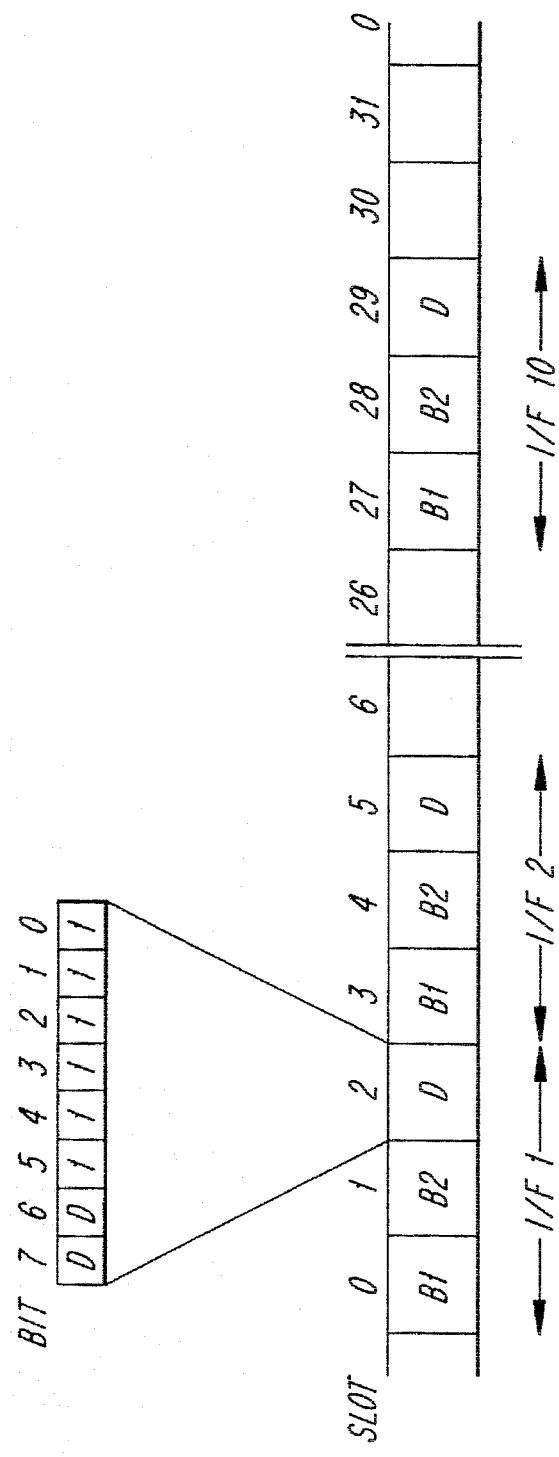
Fig. 5A
Fig. 5B
Fig. 5C
Fig. 5D

DECENTRALIZED BASE STATION FOR REDUCING BANDWIDTH REQUIREMENTS FOR COMMUNICATIONS TO AND FROM RADIO TRANSMITTER-RECEIVERS IN A TELECOMMUNICATIONS NETWORK

This application is a continuation of application Ser. No. 08/202,179, filed Feb. 25, 1994, now abandoned.

BACKGROUND

The present invention relates to a decentralized base station for reducing bandwidth requirements for communications between radio transmitter-receivers and associated mobile service centers in a telecommunications network.

The specifications for the GSM system, or Global Systems for Mobile Communication system, were drafted several years ago. At that time, microcells and picocells were not in use in cellular telecommunication systems. The advent of micro- and picocells, although advantageous, has led to difficulties and greater expense in linking such cells to their respective base stations. The interfaces specified for GSM are suited for normal cells with base stations having many assigned frequencies and many transmitter-receivers (referred to herein as TRXs or transceivers). One example of such a system is disclosed in a copending application Ser. No. 08/149,532, entitled "A Radio Module Included in a Primary Radio Station, and a Radio Structure Containing Such Modules", filed Nov. 9, 1993, still pending, in the name of Philippe Charas, and assigned to the assignee of the present invention, incorporated herein by reference.

The components of a conventional base station are typically disposed in one location or housing. For example, in FIG. 1A, a cellular mobile radio system in Mexico using the IS-54 standard comprises a mobile services switching center MSC 10 that is connected on one side to the public switched telephone network (PSTN) and on the other side to at least one base station BS 12. Information is exchanged between the mobile services switching center MSC and base station BS using a bit rate of about 2048 kbits per second (kbps). Each base station BS 12 is conventionally physically located in a few equipments racks or housings, and includes a plurality of transceivers TRXs 14 (TRXI . . . TRXn). One transceiver TRX 14 can handle only a limited number, e.g., three, of radio channels (that is, traffic and/or control chinreels in the air interface). At least one base control function module BCF 16 and a transceiver interface TRI 18 are provided. The base control function module BCF 16 performs common control functions within the BS.

The transceiver interface TRI 18 is essentially a digital time switch, which can switch 64 kbps traffic channels (in the described example, three traffic channels for each transceiver TRX) connected as 2048 kbps links on both sides of the switch. In particular, on the left side, all channels of one or several PCM (pulse code modulation) links, each of which channels transmit at 64 kbps, may be connected. A conventional PCM link has 32 channels in Mexico, and the transceiver interface TRI 14 distributes the incoming PCM channels among the various transceivers TRX. In particular, the transceiver interface TRI 18 sends/receives 3 consecutive 64 kbps PCM time slots to/from each active transceiver TRX. If only one transceiver TRX is active, the remaining 29 PCM time slots are idle because the speed on each PCM link is 2048 kbps and the maximum average speed required between the transceiver interface TRI 18 and one transceiver TRX 14 is only 192 kbps. However, in today's systems, the transceivers TRX 14 may be located remote from the transceiver interface TRI 18. Conventionally, specialized coaxial cabling is then used to handle the 2048 kbps rate. Such coaxial cabling is undesirable and costly to purchase and install.

FIG. 1B illustrates a typical configuration for the GSM system. At least one mobile services switching center MSC 10' is connected to the public switched telephone network PSTN. Like elements to those in FIGS. 1A are labelled with the numeral primed, due to slight differences in functionality between GSM elements and elements in other cellular telephone systems.

In FIG. 1B, a base station system BSS 20 is responsible for the radio-related functions, and may support one or several cells. The base station system BSS 20 may be divided into two parts, a base station controller BSC 22 and a number of base transceiver stations BTSs 24, one for each cell. The mobile services switching center MSC 10' communicates with the base station controller BSC 22 through an "A" interface. GSM Recommendations ETSI/TC GSM 08.01–08.20 (incorporated by reference herein) specify the functional split and the A Interface between a mobile services switching center and a base station system. The base station controller BSC 22 and individual base transceiver stations BTS 24 communicate through an "A-bis" interface. This interface is specified in the European Telecommunication Standards Institute ETSI/TC GSM 08.5 x –08.6 x series of specifications, incorporated by reference herein.

The A-bis interface is capable of supporting three different internal base transceiver station BTS 24 configurations: a single transceiver TRX (not shown); a collection of transceivers TRXs where all are served by a common physical connection (not shown); and a collection of transceivers TRXs, each served by its own physical connection. The last configuration is shown in FIG. 1B where a single transceiver interface TRI 18' is connected to a plurality of transceivers TRX1 . . . TRXn 14' and a base control function module BCF 16' through A-bis 2048 kbps links.

If the node supporting the base station controller BSC 22 functionality is not co-located with all of its subordinate base transceiver stations BTSs 24, the 2048 kbps A-bis interface is mandatory according to GSM Recommendation 08.51. This is normally the case when the base station system BSS supports many cells, because the cells cover different physical A conventional TRI 18', which is commercially available from Ericsson Radio Systems AB, Stockolm, Sweden, is configured as shown in FIG. 1C. The TRI may be a free-standing unit or part of the BSC in the GSM system. In FIG. 1C, only the essential blocks for routing of information through a digital cross connect switch DCC are shown. A microprocessor (not shown) may be needed for operation and maintenance. The digital cross connect switch DCC 30 is connected to the external transmission network via a number of G703 interfaces I/F 32, one for each network link 34. These links or buses 34 transmit at a rate of about 2 Mbps. The number of links 34 varies depending upon the network configuration. Each link 34 consists of a separate transmit line 36 and a separate receive line 38. On the network side of the G703 interface, I/F 32 transformers 40 are shown, which are one known way to connect the PCM links to the network.

At the G703 interface I/F 32, the transmit/receive signals are converted to/from the line coded signals HDB3 (high density bipolar code with maximum of 3 consecutive zeros) to TTL levels. One of the receive lines is selected for extraction of an 8 KHz frame sync, output by the interface 32 on line 42. This frame sync is fed to a network synchronization phase locked loop PLL 44, which generates the DCC switch system timing, that is, a stable frame sync FS line 46 and a bit clock line 48 at 2048 kHz or 4096 kHz. On the right hand side of the switch DCC 30, the transmit and receive data is connected to the 2 Mbps buses 34. The connections in the DCC switch 30 are set up by a control function input by the Configure input line 50.

According to the Open Systems Interconnection (OSI) protocol, the A-bis interface connecting the base station controller BSC 22 to the base transceiver station BTS 24 is subdivided into three layers: the physical layer (Layer 1), the data link layer (Layer 2), and the network layer (Layer 3). The physical layer 1 is the lowest layer in the OSI reference model and it supports all functions required for transmission of bit streams on the physical medium. Layer 2 is responsible for error-free communication between adjacent devices in the network and Layer 3 is responsible for, among other things, call control, mobility management and radio resource management. Layer 1 is digital at a rate of 2048 kbps with a frame structure of 32×64 kbps time slots.

Referring again to FIG. 1B, the base transceiver station BTS 24 consists of a number of transceivers TRXI . . . TRXn 14', each one supporting eight TDMA (time division multiple access) channels, and centralized or distributed base control function module(s) BCF 16', which handles common control functions within a base transceiver station BTS 24. The transceiver interface TRI 18' is connected between the base station controller BSC 22 and the TRXs 14' and base control function module(s) BCF 16', within the base transceiver station BTS 24. Important functions allocated to the base transceiver station BTS 24 are channel coding and modulation in the downlink (base station to mobile station) direction, and demodulation, equalization and channel decoding in the uplink direction. The speech coding/decoding and data transcoding (not shown) may be located in the base transceiver station BTS 24, or optionally located outside the BTS 24, for example, at the base station controller BSC 22 or at the mobile services switching center MSC 10' site.

In conventional GSM systems, the speech coder (not shown) transforms the ordinary 64 kbps PCM speech (pulse code modulation) to speech frames at a rate of 13 kbps. If the speech and data transcoder (referred to in this description as a transcoder) is located outside the base transceiver station BTS 24, a specific protocol for "inband control of remote transcoders and rate adapters", according to GSM recommendation ETSI/TC GSM 08.60 (incorporated herein by reference), must be used. This protocol uses a 16 kbps channel for transfar of speech or data, signalling and synchronization. One such application where the transcoders are located in the mobile services switching center MSC is described in U.S. patent application Ser. No. 07/828,574, filed Jan. 31, 1992, (now application Ser. No. 08/125,136 filed Sep. 23, 1993, now U.S. Pat. No. 5,436,900) in the name of Hammar et al. and assigned to the assignee of the present application and incorporated herein by reference.

For signalling between the base station controller BSC 22 and the base transceiver station BTS 24, signalling channels at 16 kbps or 64 kbps are used. For each TRX/BCF combination, a set of logical links are defined, called operation and maintenance links OML, radio signalling links RSL (TRX only) and layer 2 management link L2ML, which are mapped to the signalling channels. A number of logical links may be multiplexed on each signalling channel. The radio signalling link RSL is used for supporting traffic management procedures, particularly mobile station to network communication. One RSL link is provided per transceiver TRX 14'. The operations and maintenance link OML is used for supporting network management procedures, such as transferring operations and maintenance messages. One OML link is provided per transceiver TRX 14' and base control function module BCF 16'. The layer 2 management link L2ML is used for transferring layer 2 management messages to the transceiver TRX 14' or base control function module BCF 16'. One L2ML link is provided per transceiver TRX 14' and base control function module BCF 16'.

Assuming the transcoder is located in the base transceiver station BTS 24 and one 64 kbps signalling channel is allocated to each transceiver TRX 14', the necessary channel capacity per TRX 14' is 9*64 kbps (8 traffic channels and one signalling channel). On the other hand, if the transcoder is remotely located and only a 16 kbps signalling channel is allocated to each TRX 14', the total capacity demand is 9*16 kbps or 2*64 kbps+16 kbps per TRX 14'.

The GSM recommendation 08.54 states that layer 1 shall utilize digital transmissions at a rate of 2048 kbps (32 * 64 kbps time slots) or at a rate of 64 kbps. In both cases, the interface should be as defined in the International Telegraph and Telephone Consultative Committee CCITT recommendation G703, incorporated herein by reference, and the physical/electrical characteristics should follow Recommendation G703.

The advent of micro- and picocells caused a decentralization of transceivers TRX in the GSM system. In particular, GSM base stations (BTS) today contains many transceivers TRX which are located close to the transceiver interface TRI. These connections are implemented via 2048 kbps PCM links as defined by the 2048 kbps A-bis interface of the GSM specifications.

One disadvantage of the 2048 kbps interface defined by the GSM specifications is their high cost. In particular, in micro- and picocell applications, both indoor and outdoor systems, one or two TRXs may be sufficient in each cell. In this case, the distribution of a 2 Mbps trunk to each cell presents a significant cost. In most cases, where the TRI is located remotely from the TRXs, coaxial cable must be used to achieve the 2 Mbps speed. This requirement significantly increases the cost of installing the BTS within, for example, a building which does not include such cabling.

SUMMARY

According to an embodiment of the present invention, in a TDMA cellular mobile radio system having at least one network control unit, at least one radio transceiver, and at least one multiplexor for multiplexing and demultiplexing digitally encoded and compressed speech transmitted between the network control unit and the radio transceiver, an apparatus is provided for, further to the reduction of the bandwidth through compression, reducing the bandwidth required on a radio transceiver side of the multiplexor for transmitting messages, comprising means for buffering the digitally encoded and compressed speech arriving at the multiplexor at a relatively higher modulation rate and retransmitting the buffered digitally encoded and compressed speech at a relatively lower modulation rate, and means for buffering the digitally encoded and compressed speech arriving at the multiplexor at a relatively lower modulation rate and retransmitting the buffered digitally encoded and compressed speech at a relatively higher modulation rate.

According to another embodiment of the present invention, an apparatus is provided for reducing bandwidth requirements in a cellular TDMA telecommunications network comprising at least one network control unit and at least one base station connected to the network control unit, the base station comprising a multiplexing means and at least one transceiver means. The apparatus further comprises means for digitally encoding and compressing speech data to be transmitted to the base station and outputting digitally encoded and compressed speech data, a first communications link between the network control unit and the multiplexing means comprising a high speed link adapted to transmit at a speed of at least 1 Mbps and a second communications link between the multiplexing means and the at least one transceiver means comprising a low speed link adapted to transmit at a speed of under 1 Mbps. The multiplexing means comprises buffering means for buffering the digitally encoded and compressed speech data being transmitted toward the transceiver at a relatively higher transmission rate and retransmitting the buffered speech data at a relatively lower transmission rate, and buffering means for buffering the digitally encoded and compressed speech data arriving from the transceiver at a relatively lower transmission rate and retransmitting the buffered speech data at a relatively higher transmission rate.

According to another embodiment, a decentralized base station is provided for use in a cellular TDMA telecommunications network, comprising at least one mobile services switching center, transcoder means provided remotely from the base station for digitally encoding and compressing speech data to be transmitted to the base station, and at least one transceiver for communicating with mobile stations. The base station further comprises a transceiver interface for interfacing between a network control unit and the transceiver, a first communications link connected between the network control unit and the transceiver interface, the first communications link being adapted to transmit the digitally encoded and compressed speech data at a relatively high transmission rate, at least one second communications link connected between the transceiver interface and each of the transceivers, the at least one second communications link being adapted to transmit the digitally encoded and compressed speech data at a relatively lower transmission rate, and means provided in the transceiver interface, for adapting the rate of the first communications link to the lower rate of the second communications link.

Still other features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIGS. 5A–5D illustrate the frame synchronization used in one embodiment of the present invention.

DETAILED DESCRIPTION

According to the present invention, a decentralized base station has an alternative for the physical layer (Layer 1) of the A-bis interface and preserves all other layers of the A-bis standard. This description assumes location of the transcoder remote from the base station, as described in the aforementioned Hammer et al. application. In such cases, the information is transmitted to and from the base station in a digitally encoded and compressed format. This digitally encoded and compressed code is the one used also in the air-interface and requires, in GSM, about 13 kbps for one speech channel. This is compared with the 64 kbps required for uncompressed PCM encoded speech according to CCITT G703 used earlier for transmission of speech from and to a base station when transcoders were located within the base station. The compressed code requires about four times less bandwidth or only two oat of eight bits in an eight bit PCM word. This fact, i.e., that digitally encoded and compressed speech is used, is important to the invention because only the combination of compressing of the code and the demultiplexing and multiplexing of the results in a low enough bit rate enables replacing the coaxial cable by four or two-wire transmission links when handling one transceiver TRX.

According to the present invention, dual pairs of copper wires, capable of supporting 192 kbps of transmission in each direction can be used for information transfer between the TRX/BCFs and a concentrating node within the base station. That is, ordinary telephone lines can be used between a transceiver interface and remote and local transceivers making up a base station, thus reducing the cost and increasing the ease of implementation. Another alternative, using only single pair connections, is also presented.

Figure 2:
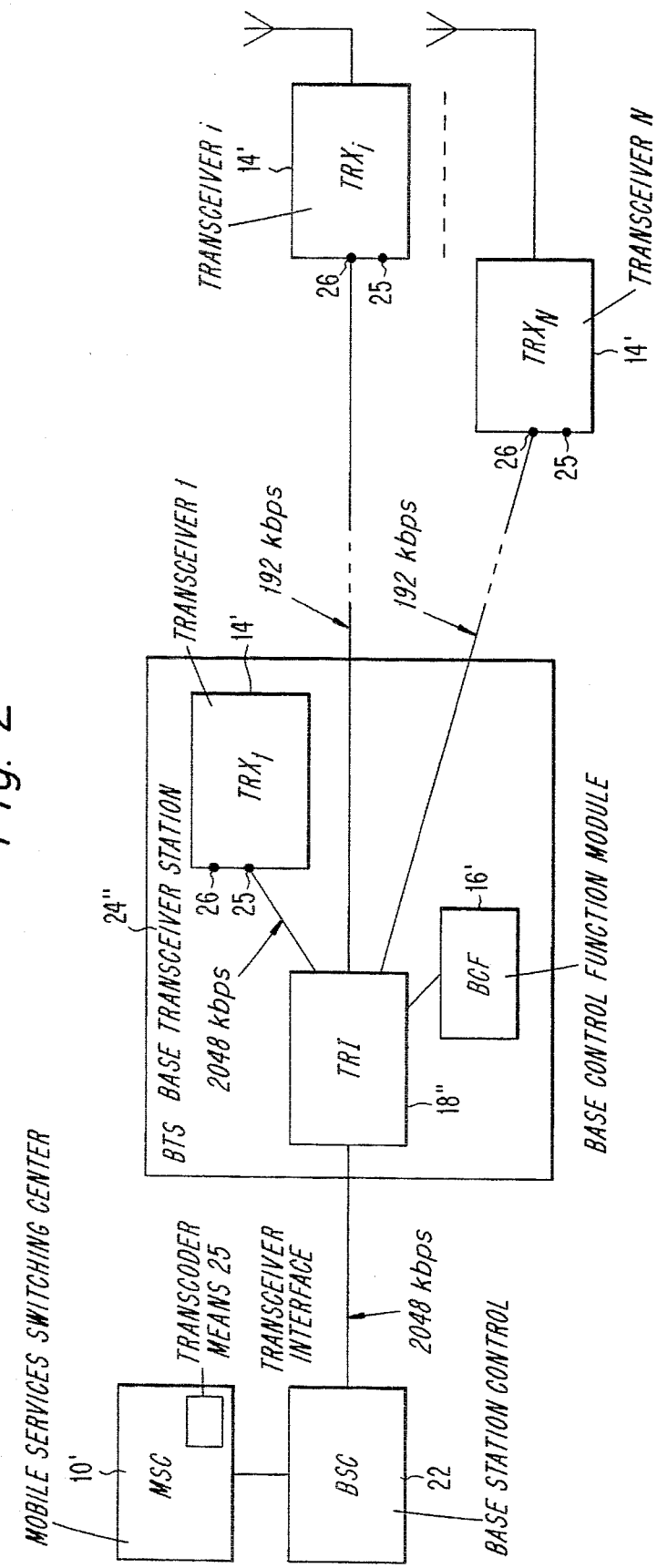
FIG. 2 illustrates one embodiment of the present invention.

Referring to FIG. 2, according to one embodiment of the present invention, existing systems can be retrofit and new systems built by providing a new transceiver interface TRI 18", a mobile services switching center MSC 10', a base station controller BSC 22 (for GSM, TDMA systems), and the transceiver TRX 14'. As discussed above, the present invention assumes that the transcoder means 25 is located remotely from the base station. The transcoder 25 is shown in FIG. 2 as part of the MSC 10'.

Figure 1A:
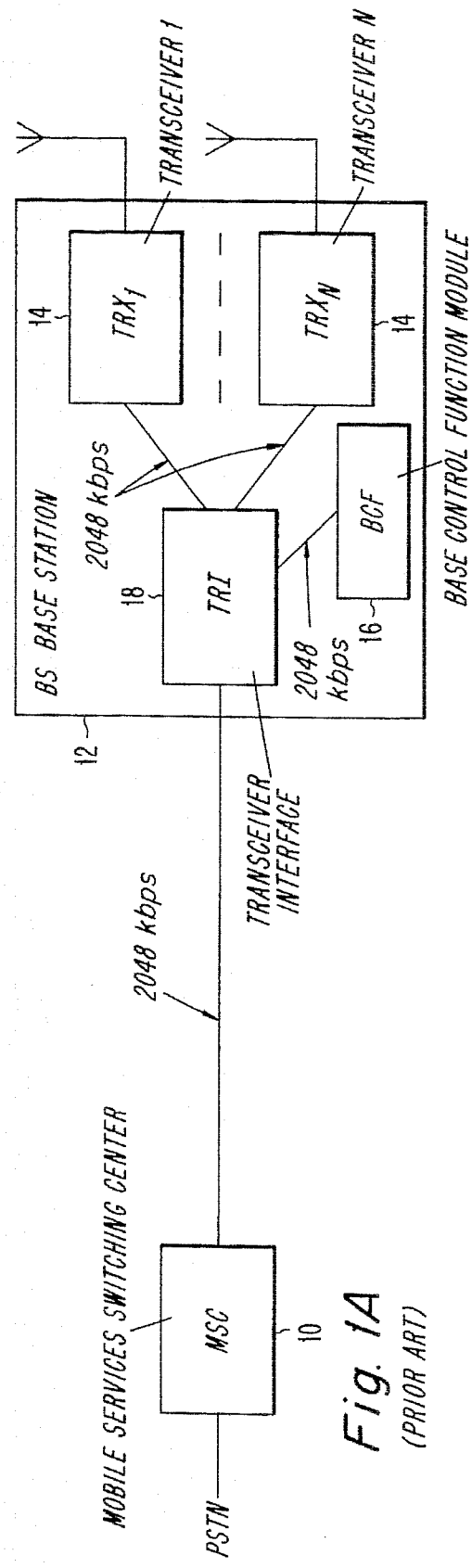
FIG. 1A is a schematic illustration of a conventional telecommunications system in Mexico.
Figure 1B:
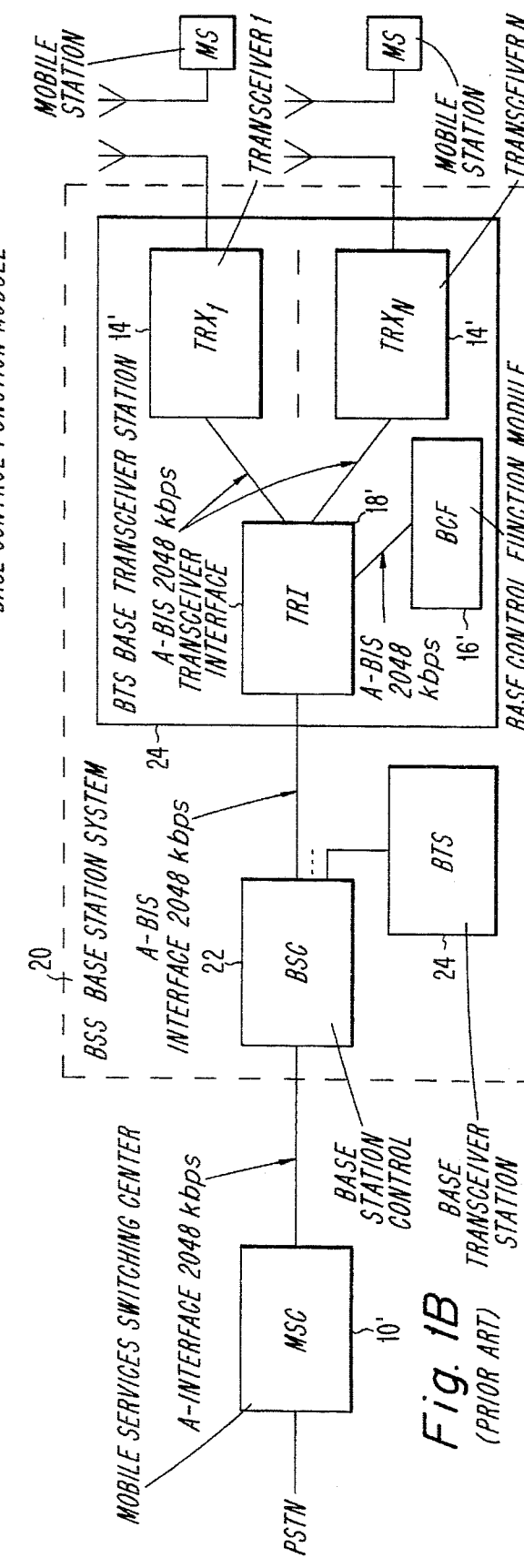
FIG. 1B is a schematic illustration of a conventional telecommunications system according to the GSM specifications.

The transceiver interface TRI is a functional module that can be used in GSM base stations BTSs. Elements in FIG. 2 are referenced by the same numerals as those used in referencing like elements in FIG. 1B or by the same numerals and double primes to indicate that elements are different from the elements in FIG. 1B. The transceiver interface TRI 18", or multiplexor 18" includes a multiplexing capability which enables the multiplexor 18" to interface between the 2 Mbps links on the base station controller BSC 22 side and 192 kbps links on the TRX/BCF side and to increase or decrease the transmission rate depending on the direction of travel, and respectively handled voice channel traffic volume. In this way, the need for coaxial cabling between the transceiver interface TRI 18' and the TRX 14' of the prior art is eliminated.

In particular, Applicants' decentralized base station includes a plurality of transceivers TRXi ... TRXn, which are remote from the base station and are connected by 192 kbps ISDN (Integrated Services Digital Network) interface lines to the transceiver interface TRI 18" within the base station BTS. The transceiver interface TRI 18" can also be connected to any number of local or proximate transceivers TRX 14' using a 2048 kbps line. According to the present invention, the TRI 18" may be constructed as described below.

According to the present invention, the TRXs 14' may include two connectors, one for low speed remote connection (26) and one for high speed local connection (25).

Figure 3:
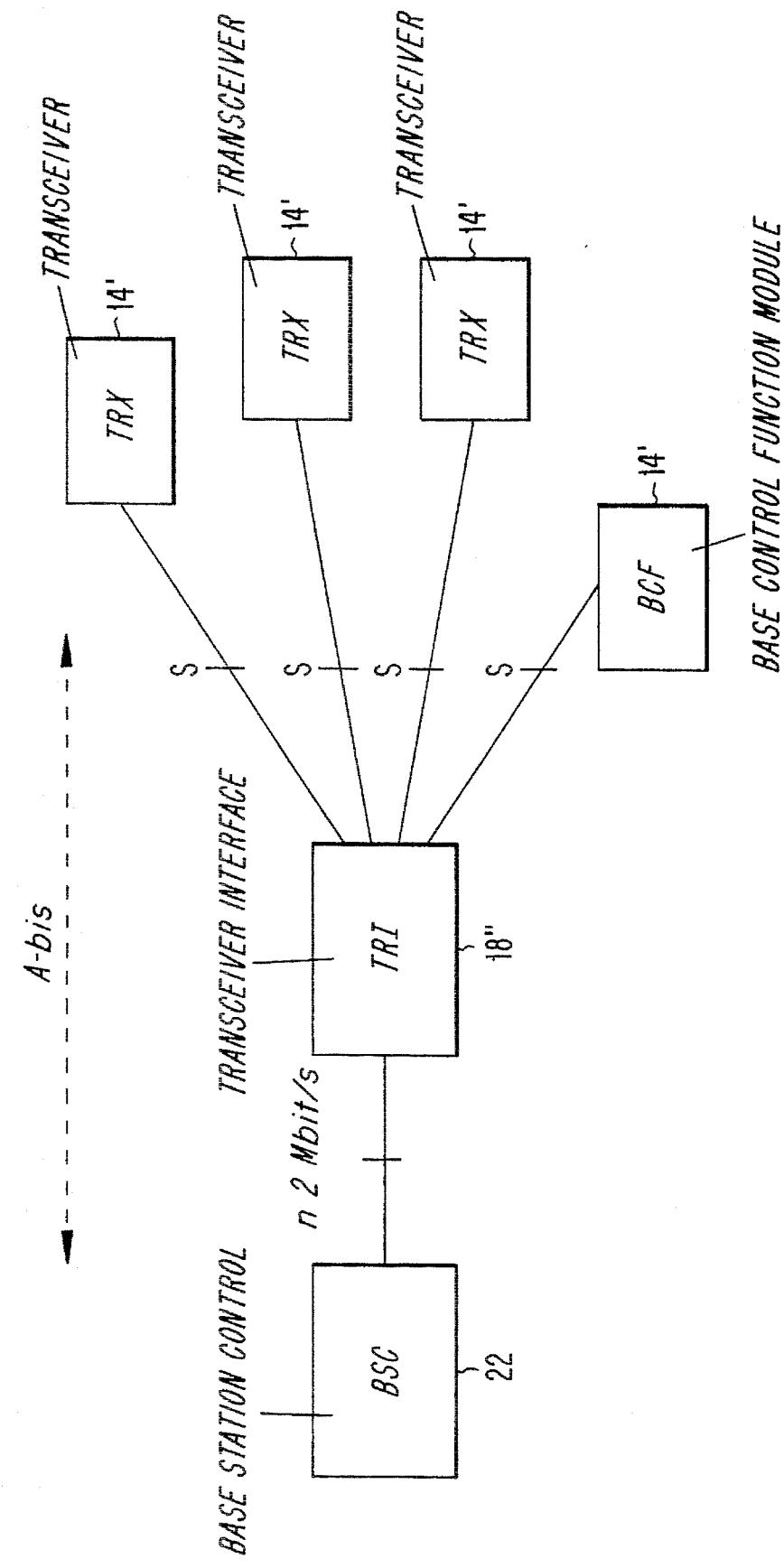
FIG. 3 illustrates a multiplexing device interposed along the A-bis interface according to one embodiment of the present invention.

FIG. 3 illustrates one embodiment of the present invention in which a transceiver interface TRI 18" is added in the transmission path between the base station controller BSC 22 and the TRXs/BCFs 14'/16'. In the embodiment illustrated in FIG. 3, the TRXs 14' may belong either to the same or to different cells. Between the base station controller BSC 22 and the transceiver interface 18" may be a number of 2 Mbps trunks, in accordance with the A-bis recommendations. These physical connections can be for example, coaxial cables.

According to a preferred embodiment, the physical communications links between the transceiver interface 18" and the TRXs/BCFs 14' are 4-wire or twisted-pair links (the "S" interface). The S-interface is called the ISDN Basic User-Network Interface, specified by CCITT Recommendations I.412 and I.430 (Layer 1 Specification), which are incorporated herein by reference. This interface has a channel structure 2B+D, which means that there are two B-channels at 64 kbps each and one D-channel at 16 kbps. Thus, the four-wire or twisted-pair links are capable of transmitting at a rate of 192 kbps.

Alternatively, 2-wire connections can be used between the transceiver interface TRI 18" and the transceiver TRX 14'. To support full duplex transmission over the 2-wire connection, echo cancelling may have to be added at the interfaces. The 2-wire interface is called the "U" interface in ISDN terminology.

A 2B+D-channel structure is well suited to the demand of one transceiver TRX, if the transcoder is located remotely from the transceiver TRX and only 16 kbps is used for signalling. The eight TDMA-channels, each demanding 16 kbps, are multiplexed on the two B-channels, according to CCITT Recommendation I-460 (herein incorporated by reference), in compliance with the GSM recommendations. The remaining D-channel, at 16 kbps, is used for the signalling channel, supporting the logical links RSL, OML, and L2ML.

In the transceiver interface TRI 18", the D-channels are either rate-adapted or multiplexed with other D-channels to 64 kbps. The adapted or multiplexed D-channels and the B-channels from all transceivers TRX 14' and base control function modules BCF 16' are multiplexed on the 2 Mbps links (not shown in FIGS. 2 or 3). Multiplexing of the D-channels can, for example, be performed statistically at Layer 2, with queuing.

The TRI 18" performs multiplexing and demultiplexing operations, depending on the direction of the transmission. According to one embodiment, shown in FIG. 4, the transceiver interface TRI 18" includes a digital cross connect switch DCC 30. The digital cross connect switch DCC 30 is able to connect any 64 kbps time slot on the network side to any 64 kbps connection on the transceiver TRX 14' side. The configuration of the connections through the DCC 30 can be controlled locally by the transceiver interface TRI 18" or be remotely controlled by the base station controller BSC 22 or mobile switching service center MSC 10'.

Figure 1C:
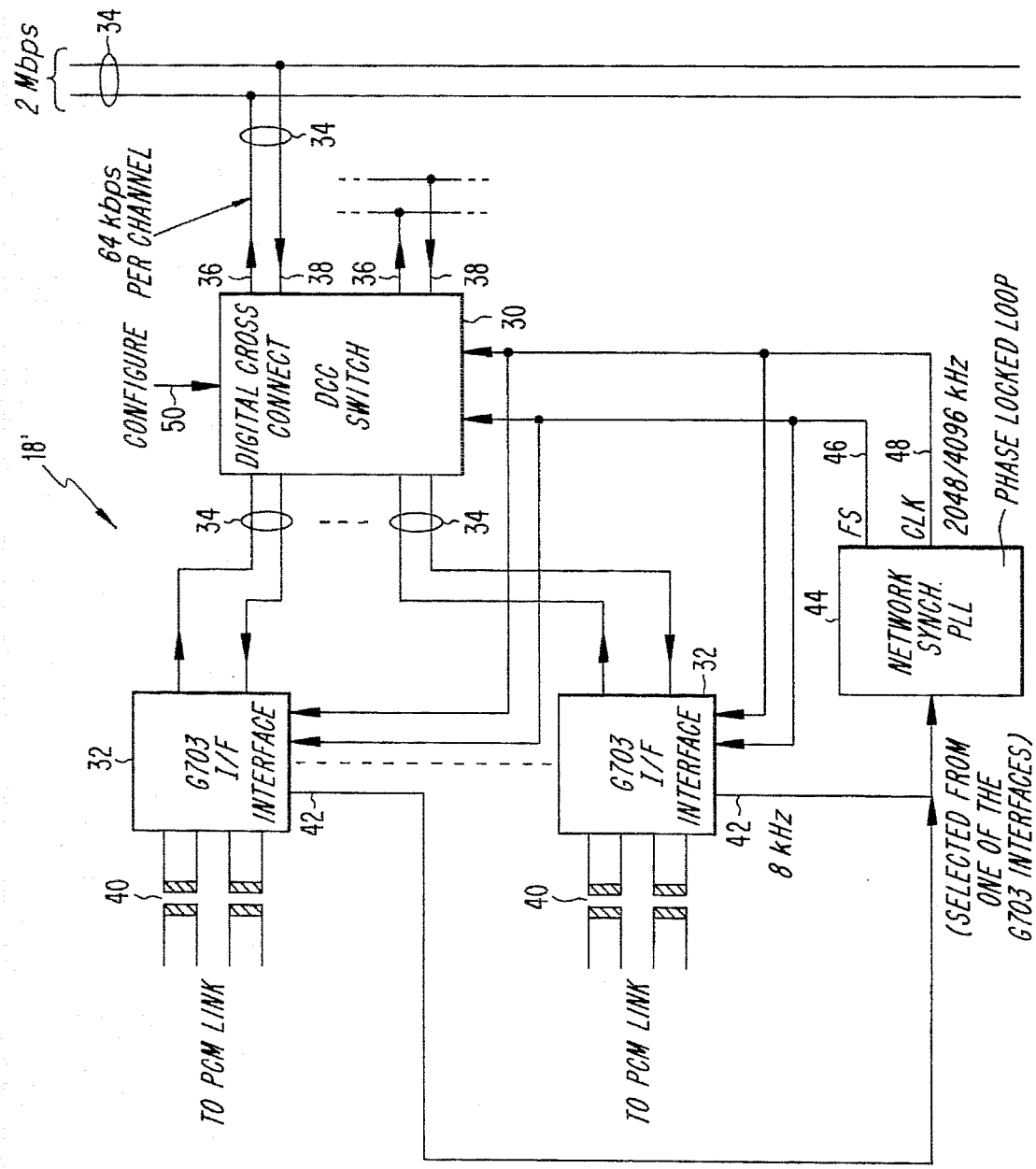
FIG. 1C is a conventional configuration for a transceiver interface TRI.
Figure 4:
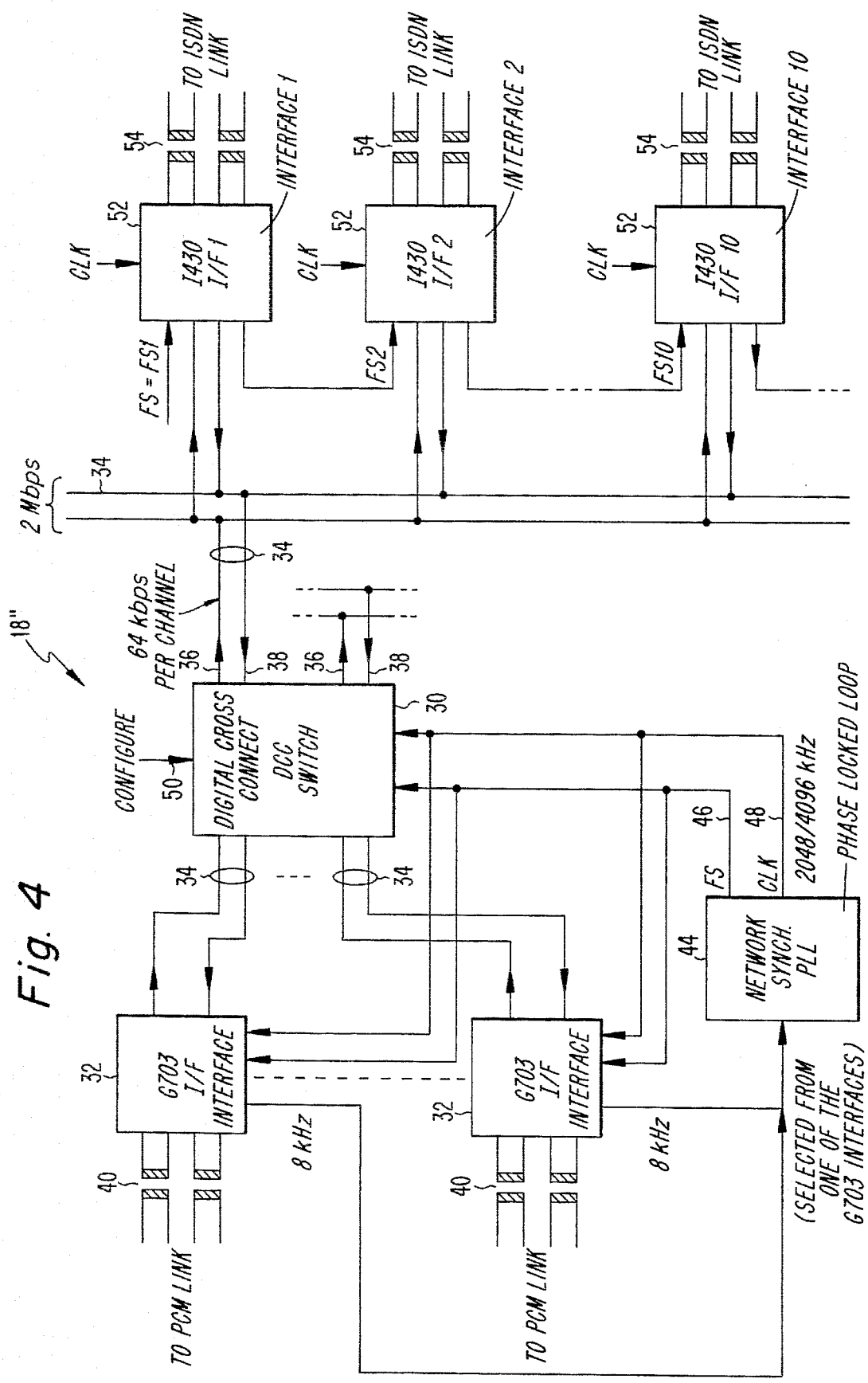
FIG. 4 illustrates an implementation of the multiplexing device MX according to one embodiment of the present invention.

The connections to the transceiver interface TRI 18" may be implemented in a number of ways. FIG. 4 illustrates one implementation of the connections to the transceiver interface TRI 18". The left side of FIG. 4, when viewed by looking at the paper, is the same as the TRI 18' shown in FIG. 1C, up to and including the 2 Mbps right hand termination of the switch, and so will not be described again.

Applicants' apparatus reduces the bandwidth needed for communication buffering and retransmitting information. The apparatus provides a low frequency version of a logically unchanged A-bis interface for use with remote transceivers TRX. According to a preferred embodiment of the present invention, this apparatus includes a number of I.430 (2B+D) interfaces I/FI ... I/Fn 52 connected to the right side of the 2 Mbps buses 34. The other side of the interfaces I/FI ... I/Fn 52 are connected through transformers 54 to the remote TRXs/BCFs 14' by 192 kbps ISDN links. Each I.430 interface I/F 52 handles, for example, three 64 kbps timeslots, one for each B-channel and one for the D-channel. Possibly a fourth timeslot may be allocated for the control/status information channel included in the I.430 interface.

Each bus carries 32 timeslots; that is, if three timeslots are allocated to each I.430 interface, ten ISDN connections can be served by each bus. With an allocation of four slots per interface, only eight ISDN connections can be served.

The three or four timeslots may be allocated consecutively from the 2 Mbps frame as illustrated in FIG. 5A. In addition to transmit and receive data, the frame and bit synchronization signals are connected to all I.430 interfaces.

One possible method of synchronizing the interfaces 52 to the 2 Mbps data stream is to connect the frame sync lines FS 46 in a daisy chain between the interfaces 52. The frame sync signal provided to each interface determines that interface's access window. The frame sync signal is then delayed three or four timeslots, and then fed to the input of the next interface. This is illustrated in the timing diagrams of FIGS. 5B through 5D. The frame sync lines FS1 ... FS10 are shown in FIG. 4.

Every timeslot on the 2 Mbps bus consists of eight bits of information at a rate of 64 kbps. As noted above, the D-channel of the I.430 interface is only a 16 kbps channel; thus, the D-channel has to be rate adapted to the 64 kbps channel. This is performed, according to one embodiment, by putting the D-channel bits into only the first two bits of one of the timeslots. The remaining six bits of the timeslot are set to binary 1, as shown in FIG. 5A.

The I.430 interface may be implemented by a single component, connected directly to the four wire connections via transformers. If single twisted-pair connections are used, hybrids may be connected to the four wire connections. The single component may include the following functions (including rate adaptation):

"downlink" buffers for storing data received from the 2 Mbps bus before transmission on the twisted pair or four wire connection, and "uplink" buffers for storing the data received from the twisted-pair or four wire connection before transmission on the 2 Mbps bus; "downlink" refers to transmissions from the mobile switching services center MSC to the mobile stations, and "uplink" refers to transmissions from the mobile stations to the base station controller BTS and the mobile switching services center MSC;

pseudo-ternary line coder/decoder, according to the I.430 recommendation, applicable to a four wire interface, and an echo-cancelling coder/deCoder for use with a twisted-pair interface;

line driver and line receiver; and control and timing.

According to a preferred embodiment of the present invention, the control and timing function includes the storage of 24 or 32 bits (3 or 4 timeslots) in the downlink buffer using a 2048 (or 4096) kHz clock, starting at the FS1 position. The information is reformatted according to the I.430 protocol, which includes insertion of control bits. The information is then transmitted from the buffer at a rate of 192 kbps. Also, the uplink path is handled in a similar way by the control and timing function.

The present invention can, for example, be implemented using a limited set of off-the-shelf products. An example of such a group of products is the MITEL family of components. For each of the digital cross connect DCC blocks shown in FIG. 5, there is a MITEL component as follows. The G703 I/F can be implemented by the MITEL MH89790, CEPT PCM 30/CRC-4 Framer & Interface. This is a 40-pin hybrid circuit supporting one full duplex 2 Mbps trunk connected to the line via transformers and a passive network. The network synchronization phase locked loop PLL can be implemented as the MITEL MT8940, T1/CEPT Digital Trunk PLL. The switch DCC can be a MITEL MT8980D Digital Switch, or MT8981D Digital Switch. The 8980D switches 8 times 32*64 kbps input channels to 8 times 32*64 kbps output channels. The 8981D has half the capacity of the 8980D. The I.430 I/F interface can be a MITEL MT8930 Subscriber Network Interface Circuit, which supports one 2B+D 4-wire wire connection. The above components are described as examples only. Any comparable product, such as, for example, one or more ASIC, can be substituted for these components, within the skill of the ordinary artisan.

In certain cases, the basic access 2B+D channel structure does not fulfill the capacity requirements of a TRX. For example, when the TRX carries half-rate traffic channels, it is possible that 16 times 16 kbps (i.e., four B-channels) will be required. In addition, it is possible that the 16 kbps D-channel is insufficient for transceivers TRX having heavy signalling loads or requiring small signalling delays.

According to one embodiment of the invention, the interface may be doubled, that is, two pairs may be used when the capacity of the 2B+D channel structure is insufficient. Alternatively, the bandwidth of the interface may be increased. Currently, a new ANSI standard is being developed for use on 2-wire copper cables, called the HDSL (High-Bit-Rate Digital Subscriber Lines). See "A Technical Report on High-Bit-Rate Digital Subscriber Lines "HDSL"", TI E1.4/92-002 RI Technical Report, Feb. 14, 1992 (incorporated by reference herein). The bit rate of that interface is 784 kbps, using echo-cancelling techniques. Doubling that interface, i.e., using 2 pairs, allows for 24 times 64 kbps, which is the capacity of a T1 trunk. Using this HDSL interface instead of the basic access 2B+D channel structure provides a system having capacity for more than one transceiver TRX.

Umbrella cells are sometimes employed in areas of heavy mobile traffic to facilitate registration, paging and set-up of calls. Actual conversations are carded out at low power levels, e.g., by a desktop remote transceiver proximate to the subscriber. Standard handoff techniques are used to assign a voice channel immediately following call set-up. Call set-up is centralized to few umbrella sites, reducing the number of base stations required. In this case, desktop remote transceivers connected by 2- or 4-wire telephone lines will handle the conversation phase. In such a system, the base stations are synchronized for the adaptive selection of channels and to minimize interference of a single in-house call to affect only one time slot. Also, a single remote transceiver including two synthesizers can send or receive on time slots within a frame with different frequencies, thus allowing adaptive channel selection at call set up and during handoff. Dedicated control information and paging enters the system through an umbrella channel, for example, a channel covering the entire building with its radiowaves. The umbrella cell includes traffic channels on which the call may proceed until handoff to a desktop remote transceiver is possible. For more complete description of the background to these embodiments, reference is made to U.S. Pat. No. 5,235,632 and U.S. copending application Ser. No. 07/714,566, filed on Jun. 13, 1991, now U.S. Pat. No. 5,479,595, both hereby incorporated by reference.

The present invention is of great commercial value because it enables, among other things, the sharing of in-house telephone cabling with cabling for desktop TRXs. In other words, the present invention eliminates the requirement for special coaxial cabling in a building which includes conventional in-house telephone cabling. According to the present invention, a transceiver interface which includes a buffering capability is used for communication with remote TRXs in a cellular mobile telephone system. The inventive interface according to the present invention is used in a GSM system, in which a standard exists (A-bis) allowing 2048 kbps or 64 kbps connections, when 64 kbps is too slow for a remote TRX, leaving 2048 kbps as the only choice for communication with a remote TRX. The use of the buffering capabilities in the inventive interface allows the same TRXs to be used locally or remotely by providing speed conversion in the interface and in the TRX, such as provided by the I.430 interface. Each TRX is provided with two separate connectors, one for connecting to 2048 Kbits/s when the TRX is used locally in a base station BTS, and another connector for connecting to 192 Kbits/s when the TRX is used with the inventive multiplexor remotely from the BTS. The two terminations are shown as one in the figures. A I.430 interface, as previously described, is used on the 192 Kbits/s termination.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. An apparatus for reducing bandwidth requirements in a cellular TDMA telecommunications network comprising:

at least one network control unit;

at least one base station connected to the at least one network control unit, the at least one base station comprising a multiplexing means and at least one transceiver means;

means for digitally encoding and compressing speech data to be transmitted to the at least one base station and outputting the digitally encoded and compressed speech data to the at least one network control unit;

a first communications link between the at least one network control unit and the multiplexing means comprising a high speed link adapted to transmit at a speed of at least 1 Mbps;

a second communications link between the multiplexing means and the at least one transceiver means comprising a low speed link adapted to transmit at a speed under 1 Mbps; and the multiplexing means comprising:

buffering means for buffering the digitally encoded and compressed speech data being transmitted toward the at least one transceiver at a relatively higher transmission rate and retransmitting the buffered speech data at a relatively lower transmission rate; and buffering means for buffering the digitally encoded and compressed speech data arriving from the at least one transceiver at a relatively lower transmission rate and retransmitting the buffered speech data at a relatively higher transmission rate.

2. The apparatus of claim 1, wherein the second communications link comprises a 2-wire interface.

3. The apparatus of claim 1, wherein the second communications link comprises a 4-wire interface.

4. The apparatus of claim 1, wherein the low speed link transmits at a rate of about 192 kbps.

5. The apparatus of claim 1, wherein the second communications link comprises two 2-wire pairs.

6. The apparatus of claim 1, wherein the second communications link comprises ISDN interface lines.

7. The apparatus of claim 1, wherein the second communications link comprises a high-bit-rate digital subscriber interface line.

8. The apparatus of claim 1, wherein the high speed link comprises a transmission link transmitting at a rate of about 2048 kbps according to GSM specifications.

9. The apparatus of claim 1, comprising:

wherein the cellular telecommunications network is a GSM system and the at least one network control unit comprises at least one base station controller.

10. A cellular TDMA telecommunications network, comprising:

a decentralized base station;

at least one mobile services switching center;

transcoder means provided remotely from the base station for digitally encoding and compressing speech data to be transmitted to the base station;

at least one transceiver for communicating with mobile stations;

a network control unit adapted to receive the digitally encoded and compressed speech data from said transcoder means;

a transceiver interface for interfacing between the network control unit and the at least one transceiver;

a first communications link connected between the network control unit and the transceiver interface, the first communications link being adapted to transmit the digitally encoded and compressed speech data at a relatively high transmission rate;

at least one second communications link connected between the transceiver interface and each of the at least one transceivers, the at least one second communications link being adapted to transmit the digitally encoded and compressed speech data at a rate relatively lower than the transmission rate of the first communications link;

means provided in the transceiver interface, for adapting the rate of the first communications link to the lower rate of the at least one second communications link.

11. The decentralized base station of claim 10, wherein the at least one second communications link comprises 2 or 4 wire connections.

12. The decentralized base station of claim 10, wherein at least one of the at least one transceiver is disposed at a location remote from the transceiver interface.

13. The decentralized base station of claim 10, wherein the at least one of the at least one transceiver is disposed at a location proximate to the transceiver interface.

14. The decentralized base station of claim 10, wherein the cellular telecommunications network is a GSM system and the network control unit comprises at least one base station controller.

15. The decentralized base station of claim 10, wherein the high transmission rate of the first communications link is about 2 Mbps and the low transmission rate of the second communications link is about 192 kbps.

16. The decentralized base station of claim 10, wherein said at least one transceiver comprise a first connector for low speed remote connection adapted to be connected to said at least one second communications link and a second connector for high speed local connection.

* * * * *